United States Patent [19]

O'Coin

[11] 4,197,893

[45] Apr. 15, 1980

[54] REUSEABLE PUNCTURE SHIELD FOR TIRE CASINGS

[76] Inventor: Bernard J. O'Coin, 1087 Tanglewood, Oakville, Ontario, Canada

[21] Appl. No.: 860,852

[22] Filed: Dec. 15, 1977

[51] Int. Cl.² ............................................. B60C 17/00
[52] U.S. Cl. .................................. 152/310; 152/312; 152/314
[58] Field of Search ............................. 152/310–312, 152/346–348, 314, 313, 315, 203–205

[56] References Cited

U.S. PATENT DOCUMENTS

| | | | |
|---|---|---|---|
| 1,390,249 | 9/1921 | Privett | 152/348 |
| 1,498,143 | 6/1924 | Allyan | 152/347 |
| 1,875,102 | 8/1932 | Morse | 152/205 |
| 2,708,469 | 5/1955 | Lydon | 152/314 |
| 3,095,917 | 7/1963 | Arsandaux | 152/312 |
| 4,058,152 | 11/1977 | Beck et al. | 152/310 |

FOREIGN PATENT DOCUMENTS 956218 10/1974 Canada ............................ 152/361 R
2442917 3/1976 Fed. Rep. of Germany ........... 152/310

Primary Examiner—Stephen G. Kunin
Assistant Examiner—Lawrence E. Williams
Attorney, Agent, or Firm—Kerry Maxwell Hill

[57] ABSTRACT

A puncture resistant pneumatic tire including a casing and an inner tube where the side walls of the casing flex under load a known amount, the method of designing a puncture shield which does not fail from reversion when driven at high speeds. The shield is made in a mould from liquid natural rubber a foaming agent and other compounds. The outer surface of the ring is contoured to mate with the lower inside of the tire casing and the upper or inner surface of the ring is designed to protect the tube from bulging in use and to be able itself to withstand flexing at the flex zone of the casing, by forming the inner surface with a convex shape at its outer sides and by flattening and upwardly bulging the inner surface of the shield where it overlies the tread portion of the tire to create tapered wings at its sides as seen in cross section and a massive puncture resistant portion over the tire treads.

5 Claims, 5 Drawing Figures

REUSEABLE PUNCTURE SHIELD FOR TIRE CASINGS

FIELD OF INVENTION

The present invention relates to a puncture shield for use inside a vehicle tire and a means and method of forming same and fitting it to a tire casing.

PRIOR ART

It is known that considerable expense and time loss is sustained by construction equipment and heavy trucks which employ air-filled tires when used on rough terrain where sharp rocks stakes and sapling stumps can easily puncture a tire causing loss while the tire is replaced or repaired. It is known that liquid plastic material can be injected into a tire casing when secured to a wheel rim, to set and conform to the inside of the casing and provide a puncture resistant inner core or shield for the tire.

It has been found that when plastic filled tires are worn or the casing damaged requiring the discard of the casing, the plastic core must be discarded also because it bonded to the casing walls when it was formed in the casing. The cost of filling a tire casing with a plastic such as urethane can be a major part of the cost especially in large tires when the urethane cannot be saved. There is therefore a great demand and need for a puncture shield core for large tires that can be salvaged from worn or broken casings.

It is also known that most punctures are caused by objects under three inches in length. It is not necessary therefore to completely fill the tire to provide puncture protection.

Urethane or high density foam rubber can be injected into a tire to reduce flats but filled tires work well only under certain weight restrictions and when driven at speeds under 45 m.p.h. for short distances. When filled tires are used at highway speeds there is great heat generated by the flexing casing slapping agaist the fill resulting in the reversion and liqifaction of the rubber or plastic. In the case of solid rubber it will explode or separate the casing from the heat generated within. Although the fill material is injected into the tire under pressure causing expansion of the casing thereby holding the casing and fill in pressure contact, there is not sufficient resilience and elasticity in the fill to expand at the same rate as the casing as the casing flexes as it rolls on the road surface thereby creating the slapping action which generates the heat, of the inner wall surface of the casing against the fill. A tube will cling by air pressure to the casing and air will dissipate the heat.

Another disadvantage of solid or foam rubber filled tires is that they add weight to the vehicle and reduce the flexibility of the tire.

The use of boots in tires or of a casing within a casing as was done in the war to protect army vehicle tires could be used to stop small objects from piercing the tube, but the heat generated by the friction of the inner casing would cause the tire to fail at high speeds and would not protect the tube from larger objects.

OBJECTS OF THE INVENTION

It is the primary object of the present invention to provide a puncture shield for a tube-type tire which is designed to permit the tire to be run at highway speeds under load without failing from heat caused by frictional action of the casing against the shield during flexing motion of the tire on the road surface.

It is a further object of the present invention to replace solid filled tires with combinations of rubber-foam and urethane cores, urethane and tubes and foam rubber combinations using foam shield and hard cores for low speed vehicles driven on rough terrain where salvage of the cores, shields and urethane is desirable.

It is another object to provide a method of designing a reuseable puncture shield for various dimensions of tire casings.

SUMMARY OF THE INVENTION

The present invention comprises determining the flex characteristics for the particular tire casing to be protected and then moulding a shield from high density foam rubber to interfit the tire casing in a shape which will prevent puncture of a tube while being itself sufficiently flexible within the casing to overcome temperature breakdown to the foam rubber and bulging and pinching of the tube by the shield when the casing flexes and distorts while rolling on a road surface at high speeds. The contour of the shield facing the inner tube is rounded upwardly at its edges to thinly contact the casing walls at the point of maximum flex of the casing in a flap-like configuration with the mid-section smoothly bulged upwards to provide a depth of rubber shield at least three inches above the casing wall. The shield is moulded into a ring shape from natural rubber a small amount of synthetic rubber and a foaming agent such as nitrogen in a mould. The shield is designed with a relatively thin section at the crital flex point for the particular tire casing to create a hinge-like portion to the point of connection of the flap with the mid section to prevent overheating and bunching of the shield at the crital flex point.

Where the tire is to be used only for slow moving vehicles on rough terrain a one piece ring of hard rubber or other plastic such as urethane is fitted against the shield under pressure to provide a a reuseable pair of cores resistant to puncture and yet providing a comfortable ride to the operator and protecting the vehicle from undue shock from the terrain.

Where the hard rubber or urethane is to be situate next the casing additional variations in the methods of installation are employed as follows; a casing is used as a mould; a preformed shield of simple ring like foam rubber is held under pressure next the rim of a wheel holding the casing and the plastic fill is injected between them to harden under pressure in the casing. The shield can be salvaged for reuse after wear of the casing.

The preferred embodiment of the invention its method of manufacture and design, and variations of its uses and methods of installation is shown in the attached drawings where like reference numerals refer to like parts.

DISCUSSION OF THE PREFERRED EMBODIMENT OF THE INVENTION

Figure 4:
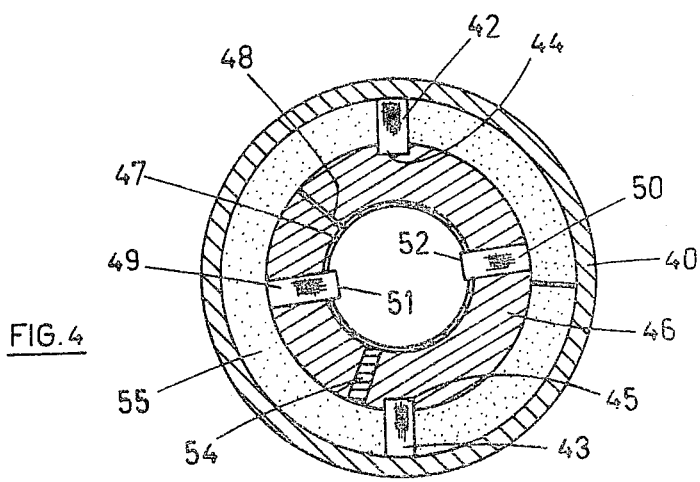
FIG. 4, is a sectional view taken through the mid section of the tire of the circumference of the tire of FIG. 3, showing an opening passage in the rim core for filling the outer casing-contacting portion of the tire.
Figure 5:
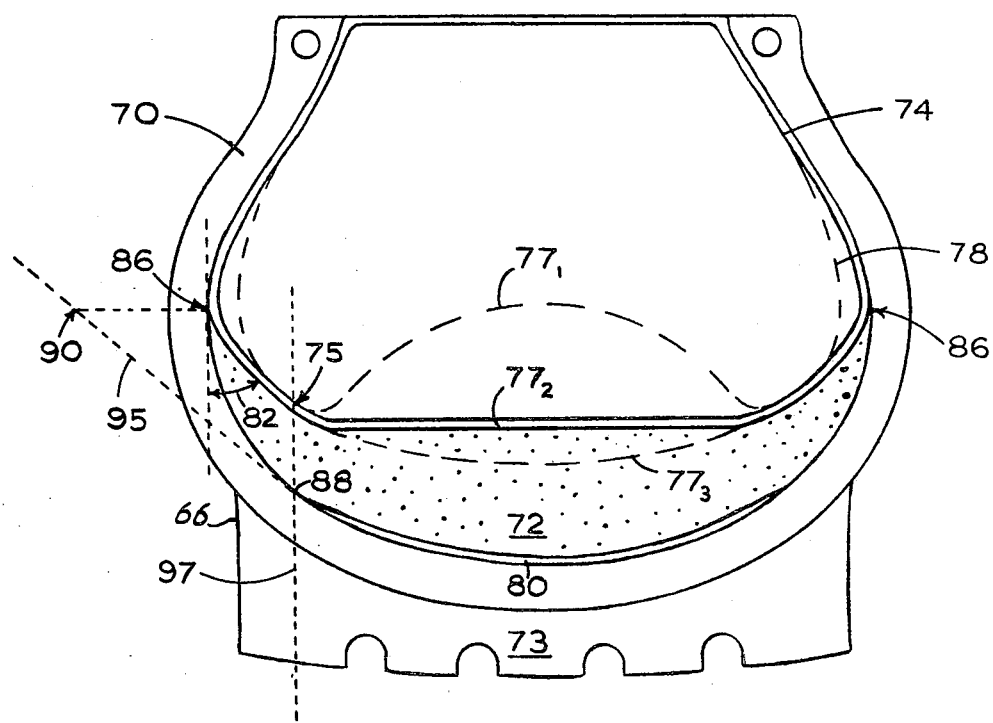
FIG. 5 is a cross sectional view of a tire casing when in the unflexed unloaded condition showing the shield of the present invention situate against the casing wall and showing the shape of the tube protecting flap and the necked portion of the shield at the critical flex point of the tire.

The shield 72 of the prefferred form of the invention is shown in FIG. 5 in use combined with a heavy duty tube 74 in a truck tire casing 70 for a truck which will be moving at highway speed and carrying a load and which would also encounter rough terrain. Where the truck or tractor would only be driven at low speeds but on rough terrain the embodiments of FIGS. 1, 2, 3, and 4 would be adequate to protect the tire from punctures.

The shield 72 is formed in a mould from natural rubber, small amounts of synthetic rubber with nitrogen as the blowing agent to result in a high density foamed rubber product. 70% natural rubber, at least should be used. Each make of tire casing will have a shield designed according to the flex characteristics of its walls. The shield 72 for casing 70 shown is designed to insure that the part of the casing experiencing the most side flex is above the top of the shield at the critical flex point of the shield 75. The area of the shield and the tire casing from dotted line 97 to the outside of the casing 70 encounters the greatest flex and is the flex zone of both. It is in this area that the shield is worked the most and where the tube bellies the most when the tire rolls. Therefore, not only must the shield be most heat resistant in that zone, as encompassed by angle of foam 82, but it must present an even contour to the tube pressing against it from above. If the upper side of the shield, 86—86, was flat a discontinuity for the tube to belly into and eventually loose its elasticity, would develop during flexing of the casing. The shield must be tapered downwardly at 86-75.

In resume; When the side walls of the casing flex outward the tube follows simultaneously to fill the cavity formed but the shield being less elastic lags in time, creating a void between it and the casing wall. Unless the shield is smoothly contoured with the tube the bunching of the slow moving shield would pinch the tube. It is the overstretching of the segment of the tube where it meets the casing that causes failure unless the shield is designed as herein.

When the tire 70 rolls on the road the tread 73 moves upward and the tire casing flexes from a point 88 toward the rim. The tread area 73 flattens out and pushes the casing upward and outward as indicated by line 95 with point 86 coming into position 90. The reaction downward of the rim causes point 86 to move out thus becoming the maximum flex point. As will be seen from FIG. 5, the actual distance of points along line 95 vary dramatically from their unflexed point. Point 88 moves only upward but 86 moves to 90. If the shield were designed to fill an unflexed casing across a line 86—86 with a tube above it pressurized to the recommended 90 psi for a truck tire under load the ring of foam rubber would make a dense mass in the casing.

The tube pressure being equal across the shield surface $77_2$, when the tire rolls the wall 70 flexes out and the pressure of the tube forces the tube wall 74 to move simultaneously with the tire. The dense mass of the slower moving shield at point 86 will overstretch the bulge in the tube at the point 86 causing it to fail after continued overstretching and pinching at that point.

The part of the shield 72 above tread 73 moves only upwards but the portion of shield 88-75 goes outwardly creating a hinge-like zone at 75-88 where stress and heat generation will occur in the shield. The greater the thickness of shield at point 75 the greater the heat generated by high speed driving and the result is breakdown of the shield. It is therefore the object of the present invention to provide a shield for use in truck tires where both tube and shield are protected from fatigue which object is achieved by making the foam rubber shield into a one piece continuous ring concavely shaped to interfit the inside of a tire casing, on the outside, and generally convexly curved on the inside to accomadate a tube under pressure. In order to give the maximum, at least three inches, of puncture protection for the tire in the tread region, the inside convex side of the shield can be bulged upwardly in a continuously smooth contour thereby creating a pair of flap like wings tapering into the outside ring of the shield. Line $77_1$ and line 78 will when combined to create the upper convex and inner side of the shield, provide the ultimate design for a puncture resistant member capable of withstanding heat and also protecting the tube from bellying and pinching as it will be seen the shield is relatively thin in the line of flex hinge zone 75. The line $77_3$ would be an adequate depth of shield where the tread lugs were of unusual depth. In short the hinge depth is of critical design depending upon the use of the tire and the speed with which it will roll.

As additional protection a removeable steel belt 80 can be fitted between the shield 72 and casing 70. The steel does not require embedding in the casing to hold it in place and to protect the tube from it because the pressure of the shield will hold it in place. When the casing is worn in the present invention the steel belt can be saved with the shield of foam and the tube. In designing a shield for a particular tire the flex zone dotted line 97 is arrived at as follows; a line parrallel with the road is drawn through the point of intersection of the tread outside edge 66 and the ouside wall of casing 70, which parallel line will intersect the inside of the casing 70 at point 88 which is the point where the wall begins to flex outwards. In FIG. 5 a dotted line is shown passing through point 86, the maximum flex point on the casing, which line is substantially tangential to the tire at 86. The tire casing shown is a nylon biased 1000×20 truck tire and the flap dimensions for the shield is found by making approximately 60 degrees angle 82 to give the upper contour of the shield for passage through point 75, the critical flex bend point of the shield 72. A mould is made using the curvature of the inside of the tire as the bottom of the mould and the limit of the flap the distance to flex point 86 of an unflexed tire. The dimensions of the flap and thus angle 82 are determined by the desired thickness of the hinge on the critical flex line 97, that is the distance allowable for hinge 88-75. With the above data for each type of tire, shields can be made for such tires from a mould designed especially for each type.

Figure 1:
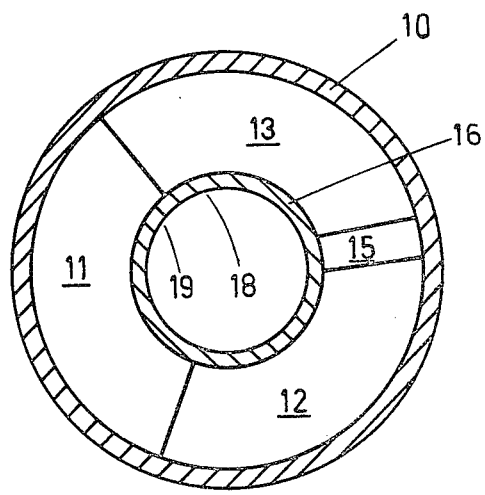
FIG. 1 depicts a simple method of fitting a puncture shield to a casing for use on slow speed machines and consists of sectional prefabricated core with a plug for holding the sections in place and means of locking the shield to the wheel rim.
Figure 2:
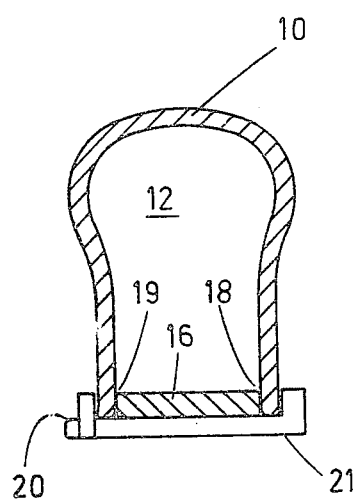
FIG. 2 is a sectional view of the tire and core of FIG. 1 showing the lock ring and rim.

The variations of the invention for varied uses are shown in FIGS. 1, 2, 3, and 4. In FIG. 1 numeral 10 designates a large tractor tire using a shield of urethane plastic which can be made in a large ring or in segments 11,12 and 13. For ease in fitting the ring to a casing plug 15 is forced between the segments in the casing. A solid ring of hard rubber or the like 16 is shown fitted between the rims 18,19 of casing 10 to assist holding the sections together when the usual hydraulic fitting means are used. FIG. 2 shows how the side and lock means 20 hold the casing 10 to wheel 21.

Figure 3:
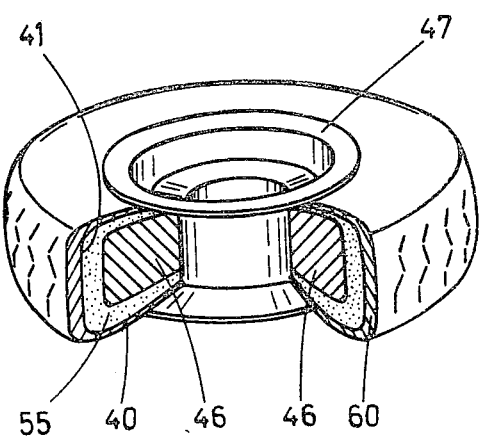
FIG. 3 is a partially cut away view of a tire having a rim or inner core of soft easily insertable cellular expansion plastic and a casing engaging shield of hard material which has been formed within the casing after the rim core ring has been interfitted to the wheel rim and in the casing under pressure.

The method of forming a removeable shield for heavy loads at low speeds is shown in FIGS. 3 and 4 where 40 is the tire casing either new or old to be used as the mould. The inside of the casing is dusted with silica powder to prevent bonding to the fill. Two nylon mesh belts 42,43 are fitted against the inside 41 of the casing to each encircle the inside 41 and each with pull tab portions 44,45 extending out from each side of the casing. A base or rim ring 46 of foam rubber is fitted to the casing proximate the rim bead and held by wheel member 47 under pressure. An opening passage 54, is formed through ring 46 or a passage is made by needle means through casing 40 to enter into the cavity between the casing and the ring 46. Liquid urethane is injected into the cavity under pressure to entirely fill and harden in the cavity. To assist the fitting of ring 46 into the casing 40 a slit 48 is made in the ring, and for ease of removeal nylon belts 49,50 encircle the ring of foam 46 but where high density foam rubber is used it can be easily deformed to fit in its place. Belts 49 50 have pull tabs 51 52 overlying the ring to assist the moulder to pull 46 out of the mould casing. The urethane injected under pressure into the casing will harden into a shield 55 pressing agaist the casing and against the foam upper rim ring. After the casing is worn it is cut off from the inner shield and ring which are saved and reused in a new casing. The shield can be slit into segments to fit a new tire or in the usual case of large tires the casing is merely expanded open at the rim bead and the shield placed inside. The foam ring is then forced in under pressure and held there by the usual rim members. In other cases a pneumatic tube can be used with the shield 55.

The filler components of my invention can all be reused whereas the known fillers cannot, primarily due to their dimensions which do not lend themselves to fitting to a new tire. The known type of filled tires cannot keep their height when they become worn whereas the use of a tube under pressure with the urethane fill 55 of tire 40 can be made to keep the requred height so important to earth moving equipment for example. As the tire 40 expands with use, as all tires are known to do, the foam 46 compressed by the injected liquid urethane, will expand to hold the shield in pressure contact with the casing thereby avoiding loss of pressure and height of the tire 40. The known filled tires will fail to hold the pressure and height because of the lack of a pressure compensator such as my ring of foam 46. In some applications the foam can be used for shield 55 with urethane in place of foam rubber 46.

The pressure compensator ring 46 can remain in the casing with the shield 55 or it can be removed and replaced with a tube under pressure. When the shield 55 is made in a mould for interfitting to a tire casing a tube can be used. Since urethane is expensive and where totally filled tires are required the embodiment and method shown in the drawings is preferred where the urethane is injected into the case under pressure to compress the foam 46 at least 5% over the requred tire pressure for load carrying. After working expansion of the tire the foam will compensate for wall growth resulting in the proper pressure. The use of the foam also provides the equipment and its operator the feel of a pneumatic ride which fact is important for both the comfort of the operator and the shock protection for the equipment.

I use urethane fill having a tear tensile strength of from 1000 to 1500 psi. In the place of an especially fabricated ring 46 being used for the rim ring it has been found that another tire casing of smaller size than tire 40 can be employed as a rim ring. The urethane is injected into the cavity between the casings while a tube keeps the rim ring in proper pressure tension until the urethane sets. The tube being in its natural environment inside a casing will allow the vehicle to operate at highway speeds as well as providing puncture resistance on rough terrain such as a junk yard where many sharp hard objects can pierce the casing 40. In the above method it is noted that before the urethane is injected and pumped between the casing 40 and the smaller casing, the smaller casing and tube must be fitted and held in the holding means or wheel rim at a pressure greater than the pressure with which the urethane will be introduced.

What is claimed is:

1. A reuseable puncture shield for use in a flexible tire casing having an outer tread portion and an inner concave surface thereto, and wherein the pair of side walls of said tire casing each have a minimum and a maximum flex point thereto, and wherein said shield is held in contact with the inner surface of said casing by a pneumatic tube disposed within the casing in the annular space above the shield, comprising in combination; a compressible ring of high density foam rubber convex in cross-section and having an outer peripheral surface mating with the concave inner surface of the casing and an inner peripheral surface mating with the outer surface of the tube the outer peripheral surface of said ring co-operating and converging with the inner surface of the casing to define a tapered flap along each side wall of said casing, each flap terminating below the maximum flex point of said casing walls.

2. A reuseable puncture shield as claimed in claim 1 wherein said ring is formed in a plurality of segments.

3. A reuseable puncture shield as in claim 1 wherein said ring has a central inner portion disposed above the treads of the casing that remains substantially flat when the tire casing and shield are flexed during use on a moving vehicle.

4. A reuseable punctur shield as in claim 1 wherein the inner surface of the ring includes a central bulged portion above the treads of the casing having a thickness of at least three inches in depth.

5. A reuseable puncture shield as in claim 1 wherein the ring has a volume less than 40 percent of the volume of the interior of the tire casing.

* * * * *